United States Patent
Dude (10) Patent No.: US 10,012,335 B2
(45) Date of Patent: Jul. 3, 2018

(54) QUICK CONNECTION ARRANGEMENT FOR DETACHABLY CONNECTING A MEDIUM LINE TO A CONNECTING PIECE

(71) Applicant: ContiTech Schlauch GmbH, Hannover (DE)

(72) Inventor: Holger Dude, Voehl-Obernburg (DE)

(73) Assignee: ContiTech Schlauch GmbH, Hannover (DE)

( * ) Notice: Subject to any disclaimer, the term of this patent is extended or adjusted under 35 U.S.C. 154(b) by 509 days.

(21) Appl. No.: 14/623,291

(22) Filed: Feb. 16, 2015

(65) Prior Publication Data

US 2015/0176739 A1   Jun. 25, 2015

Related U.S. Application Data

(63) Continuation of application No. PCT/EP2013/063173, filed on Jun. 25, 2013.

(30) Foreign Application Priority Data

Aug. 15, 2012   (DE) ........................ 10 2012 107 463

(51) Int. Cl.
*F16L 37/098*   (2006.01)
(52) U.S. Cl.
CPC ....... *F16L 37/0985* (2013.01); *F16L 37/0982* (2013.01)
(58) Field of Classification Search
CPC .......................... F16L 37/0982; F16L 37/0985
USPC ................................ 285/308, 317, 318, 305
See application file for complete search history.

(56) References Cited

U.S. PATENT DOCUMENTS

| 5,161,834 | A | * | 11/1992 | Norkey | F16L 37/0982 |
| | | | | | 285/317 |
| 5,511,827 | A | | 4/1996 | Steinkamp et al. | |
| 7,341,282 | B2 | | 3/2008 | Moretti et al. | |
| 2005/0221679 | A1 | * | 10/2005 | Takayanagi | F16L 37/0982 |
| 2009/0035055 | A1 | * | 2/2009 | Rosch | F16L 37/0982 |

(Continued)

OTHER PUBLICATIONS

International Search Report dated Aug. 6, 2013 of international application PCT/EP2013/063173 on which this application is based.

*Primary Examiner* — Greg Binda
*Assistant Examiner* — Zachary T Dragicevich
(74) *Attorney, Agent, or Firm* — Walter Ottesen, P.A.

(57) ABSTRACT

A quick connection arrangement is for detachably connecting a medium line by way of a (SAE) connecting piece, comprising a housing having an opening for receiving the medium line, and a connecting piece opening for receiving the (SAE) connecting piece, so that between the medium line and the (SAE) connecting piece, a medium can be guided through the housing. The quick connection arrangement further comprises a locking body for locking the (SAE) connecting piece in the connecting piece opening, which is essentially arranged inside the connecting piece opening and provided with at least two, essentially radially acting locking elements for locking the (SAE) connecting piece in the connecting piece opening in a longitudinal direction (A). The locking body is further provided with at least two, essentially radially acting unlocking elements, configured to make it possible to undo the locking of the (SAE) connecting piece by the locking elements when actuated.

13 Claims, 8 Drawing Sheets

(56) References Cited

U.S. PATENT DOCUMENTS

2010/0253068 A1* 10/2010 Lewcun .............. F16L 37/0982
2012/0080880 A1* 4/2012 Nakamura .......... F16L 37/0982
                                                    285/317
2012/0119485 A1* 5/2012 Cichorek ............ F16L 37/0985
                                                    285/308 X

* cited by examiner

QUICK CONNECTION ARRANGEMENT FOR DETACHABLY CONNECTING A MEDIUM LINE TO A CONNECTING PIECE

CROSS REFERENCE TO RELATED APPLICATIONS

This application is a continuation application of international patent application PCT/EP2013/063173, filed Jun. 25, 2013, designating the United States and claiming priority from German application 10 2012 107 463.1, filed Aug. 15, 2012, and the entire content of both applications is incorporated herein by reference.

FIELD OF THE INVENTION

The invention relates to a quick connection arrangement for detachably connecting a medium line by way of a (SAE) connecting piece.

BACKGROUND OF THE INVENTION

It has long been known to perform the connection between media-conveying lines and links via quick connections or quick couplings, referred to as quick connectors (QCs), in order to save time during assembly. These quick connections are used, for example, for device links which are formed as connecting pieces according to SAE-J 2044. Such quick connections are happily used in the automotive industry, for example, in the low-pressure range of fluid-conveying lines, that is, at fluid pressures of up to approximately 10 bar, at various intersections such as, for example, at the tank or in the case of pumps, filters, valves, et cetera.

It is disadvantageous in the case of such known quick connections that a latched or locked quick connection cannot be released, unlatched or unlocked again without destruction or can be only with great outlay, for example, via tools or aids. This requires time and results in costs. A quick connection separated destructively can furthermore not be reused at all or not without further measures.

SUMMARY OF THE INVENTION

It is an object of the invention to provide a quick connection arrangement of the type described above in which a quick and simple connection of media line and connecting piece is enabled alongside a quick and simple, destruction-free and reusable separation of media line and connecting piece.

The quick connection arrangement of the invention is for detachably connecting a medium line to a connecting piece. The quick connection arrangement includes: a housing defining a longitudinal direction (A) and a first opening configured to receive the medium line therein; the housing defining a second opening for receiving the connecting piece so as to permit a medium to flow through the housing between the medium line and the connecting piece; a locking body arranged in the second opening and configured to lock the connecting piece in the second opening; the locking body having at least two locking elements configured to act radially and to lock the connecting piece in the second opening in the longitudinal direction (A); and, the locking body further having at least two unlocking elements configured to act radially to release the connecting piece when locked in the second opening by the locking elements.

The present invention thus relates to a quick connection arrangement for detachably connecting a media line by way of a (SAE) connecting piece to a housing with an opening for receiving the media line and a connecting piece opening for receiving the (SAE) connecting piece so that a medium can be guided through the housing between the media line and the (SAE) connecting piece, and a locking body for locking the (SAE) connecting piece in the connecting piece opening, which locking body is arranged substantially within the connecting piece opening and has at least two substantially radially acting locking elements which are provided to lock the (SAE) connecting piece in the connecting piece opening in longitudinal direction A. The locking body furthermore has at least two substantially radially acting unlocking elements which are provided in order, by their activation, to be able to remove the locking of the (SAE) connecting piece by the locking elements.

The present invention is based on the knowledge that normal quick connection arrangements are configured to be able to produce a connection between a media line, in particular fluid line, and a connecting piece of an assembly or the like quickly, easily and with little assembly outlay, in particular few assembly hand movements or operations. However, hardly any value, if at all, has been placed in the case of these quick connection arrangements on how this connection can be separated again, in particular the fact that this connection can be separated quickly, easily and reusably.

Since, however, such connections are intended to be produced not only once during assembly, for example, of an engine of a motor vehicle and exist permanently, rather it must be possible to separate them again, for example, for maintenance purposes; the advantage of quick, easy and reusable separability of such a connection should not be ignored.

This knowledge is implemented according to the invention in that the same locking body of the quick connection arrangements which produces the quick connection between assembly and media line also has unlocking elements, via the activation of which the locking of the connecting piece can be removed again. As a result, the quick production of the connection and its secure retention are not impaired, whereas its simple, quick, reliable and reusable removal and reproduction are enabled. This saves outlay and costs in removing the connection and reproduction of the connection.

A substantially radial action of the locking and unlocking elements is to be understood within the meaning of the present invention in that these elements bring about locking of the connecting piece in the quick connection arrangements or its release via substantially radial movements. The locked connecting piece is retained and locked by the locking elements in longitudinal direction A in the quick connection arrangements. However, the mechanism required for this and the mechanism required for removing this locking have a radial movement for this purpose in order to create the space required to insert or pull out the connecting piece in longitudinal direction A within the quick connection arrangements.

According to one feature of the invention, the locking body has two locking elements which are substantially radially opposite one another and two unlocking elements which are substantially radially opposite one another.

It is advantageous in the case of this configuration that elements which are radially opposite one another can optimally interact in the case of a radial movement. The number of locking and unlocking elements is also restricted to in each case two, as a result of which the quick connection arrangement according to the invention can be manufactured and assembled in a simplified, easy and low-cost manner. Also, as a result of this, an axially symmetrical arrangement is created so that the unlocking elements can be more easily activated from outside, for example, also automated.

The locking and unlocking elements of the locking body preferably occupy in each case an approximately equal angle in the circumferential direction, that is, the locking and unlocking elements have approximately the same dimensions in the circumferential direction. It is advantageous here that elements of equal size can interact more easily and uniformly than elements with different dimensions.

According to a further feature of the invention, the unlocking elements are arranged offset by substantially approximately 90° in the circumferential direction with respect to the locking elements. This has the advantage that the locking and unlocking elements of the locking body do not hinder one another in carrying out their function according to the invention and these can act in each case in radial direction R, that is, are movable in radial direction R without hindering one another in their function according to the invention. As a result of this, an axially symmetrical arrangement is also created in which the mutually acting forces are distributed evenly in the circumferential direction.

The locking and unlocking elements of the locking body preferably occupy in each case an angle of approximately 90° in the circumferential direction. It is advantageous in this case that such an arrangement and configuration of the locking and unlocking elements facilitate an interaction according to the invention of these elements as a result of the even distribution of force in the circumferential direction.

According to a further feature of the invention, both the locking elements and the unlocking elements are provided in a radially resilient manner.

It is advantageous here that in this manner the movability or deflectability of the locking and unlocking elements substantially in radial direction R is enabled. Both elements simultaneously have a preferred position from which they are deflected by forces acting substantially radially and into which they can also spring back.

According to a further feature of the invention, the locking elements are provided to spring back radially inwards and the unlocking elements are provided to spring back radially outwards.

It is advantageous here that the locking elements in this manner in their preferred position bring about the locking of the connecting piece, for example, by engaging behind a radially outwardly directed projection of the outer surface of the connecting piece, by corresponding radially inwardly directed projections and as a result can prevent the connecting piece from being pulled out of the quick connection arrangement in longitudinal direction A without forces having to be applied for this purpose. This means that in this position no or only insignificant spring forces act in the locking elements and these are relieved of stress in this preferred position.

However, if the intention is to produce the locking of the connecting piece in the quick connection arrangement, the locking elements are deflected radially outwards by the projection of the connecting piece, but spring back out of this position again into their preferred position radially inwards and then lock the inserted connecting piece in the quick connection arrangement as soon as the projection of the connecting piece has passed the locking elements in longitudinal direction A to the inside and no longer deflects these radially outwards.

On the other hand, in the case of the unlocking elements, their preferred position is provided in the radial direction springing back to the outside. The unlocking elements can thus be pushed radially inwards for unlocking of the locking elements and then spring back into their outer preferred position again as soon as the radially inwardly acting force is removed.

According to a further feature of the invention, the locking elements and the unlocking elements have contact surfaces which are aligned in each case in the circumferential direction, can contact one another in the circumferential direction and can slide on one another in radial direction R.

It is advantageous here that the locking and unlocking elements exert via their respective contact surfaces forces which act on one another in the circumferential direction and can thus mutually deflect one another radially. In this manner, radial movements of the respective other elements can be brought about by radially acting forces on the locking or unlocking elements, either by forces brought about from outside or the spring actions of the elements themselves, without the need for further mechanical elements for this purpose.

According to one feature of the invention, the unlocking elements are provided in order to be able to be pushed radially inwards so that the contact surfaces of the unlocking elements push the locking elements radially outwards via their contact surfaces.

It is advantageous in this case that a simple action between the locking and unlocking elements can be achieved in this manner. The radially inwardly directed pushing-in of the unlocking elements leads to the contact surfaces of the unlocking elements exerting forces in the circumferential direction on the contact surfaces corresponding to them of the locking elements. These forces increase with reducing radius R as a result of the constant dimensioning of the unlocking elements in the circumferential direction.

If, during pushing-in, the contact surfaces of the unlocking elements now contact the corresponding contact surfaces of the locking elements, the locking elements are deflected radially to the outside by the forces acting in the circumferential direction. It is advantageous in this regard if the respective contact surfaces have a low frictional resistance so that the forces can be transmitted in the circumferential direction where possible without frictional losses from the unlocking elements to the locking elements and as a result this procedure can be brought about with as small as possible radially acting push-in forces.

In order to implement this active principle, it is advantageous if, on both sides of the unlocking elements, the contact surfaces interact in each case with the corresponding contact surfaces of the locking elements because as a result this procedure is facilitated and the radially acting push-in forces required for this are kept small. It is, however, also possible and encompassed by the present invention to allow the unlocking elements to exert forces with in each case only one contact surface against the locking elements in the circumferential direction since the concept of the invention can also be implemented in this manner.

According to a further feature of the invention, the housing has at least two opening recesses which are substantially radially opposite one another and through which the unlocking elements can be activated.

It is advantageous here that the unlocking elements are accessible from the outside in this manner and, in the case of a quick connection arrangement ready for operation, the unlocking elements can be activated from the outside.

According to a further feature of the invention, the quick connection arrangement furthermore has a cover for fixing the locking body within the housing, wherein the cover is retained in longitudinal direction A via at least one locking opening by at least one projection of the housing.

It is advantageous in this case that the cover can securely retain and position the locking body in the housing and the quick connection arrangement can be easily and quickly assembled and manufactured. The cover furthermore has a simple bracket with which it can be reliably retained on the housing. The cover can simultaneously, however, also be easily and quickly removed again from the housing as a result of its latched-in bracket.

The housing, the locking body and the cover can include a plastic or be made of this. A polyamide (PA), polyphthalamide (PPA) or polyphenylene sulfide (PPS) can preferably be used as the plastic. PA12, PA612, PA610, PPA or PPS is particularly preferably used as the material of the housing, PA11, PA612 or PA610 is particularly preferably used as the material of the locking body and PA12, PA612, PA610 as the material of the cover.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
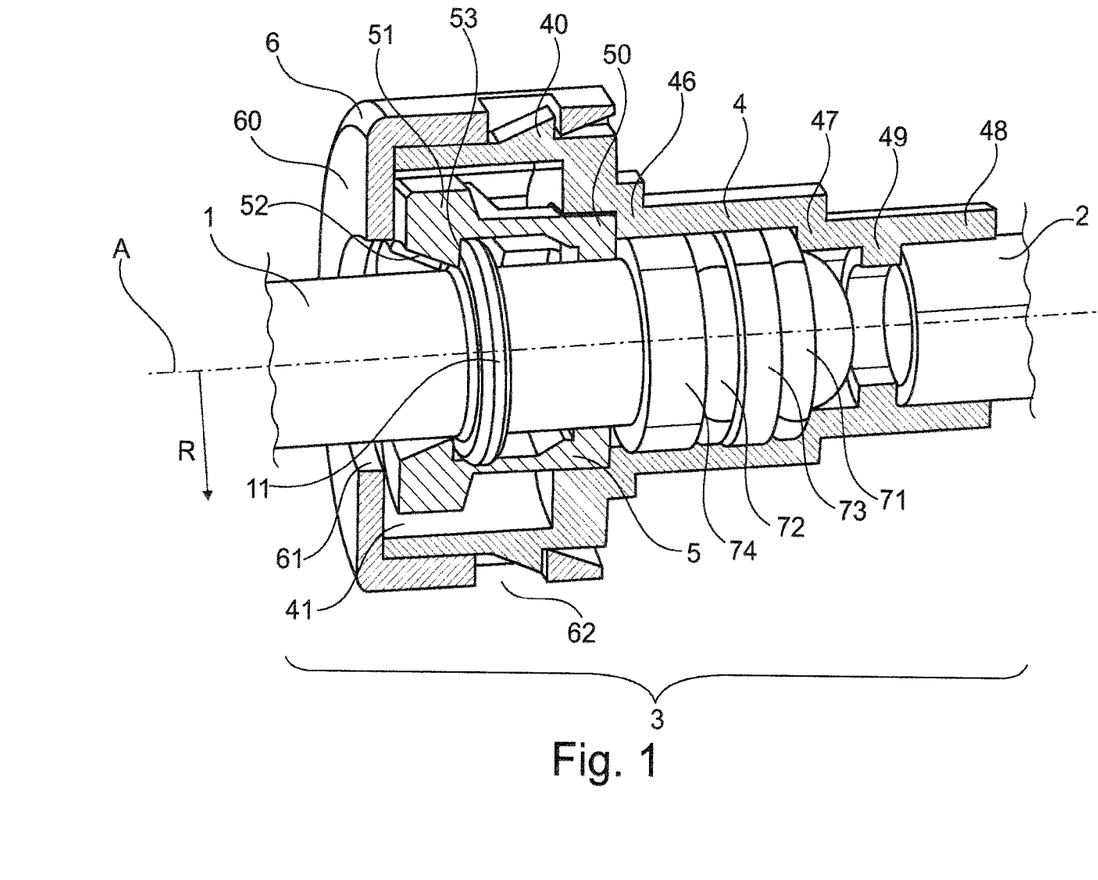
FIG. 1 shows a perspective schematic sectional representation of a quick connection arrangement with fluid line and inserted and locked connecting piece.
Figure 2:
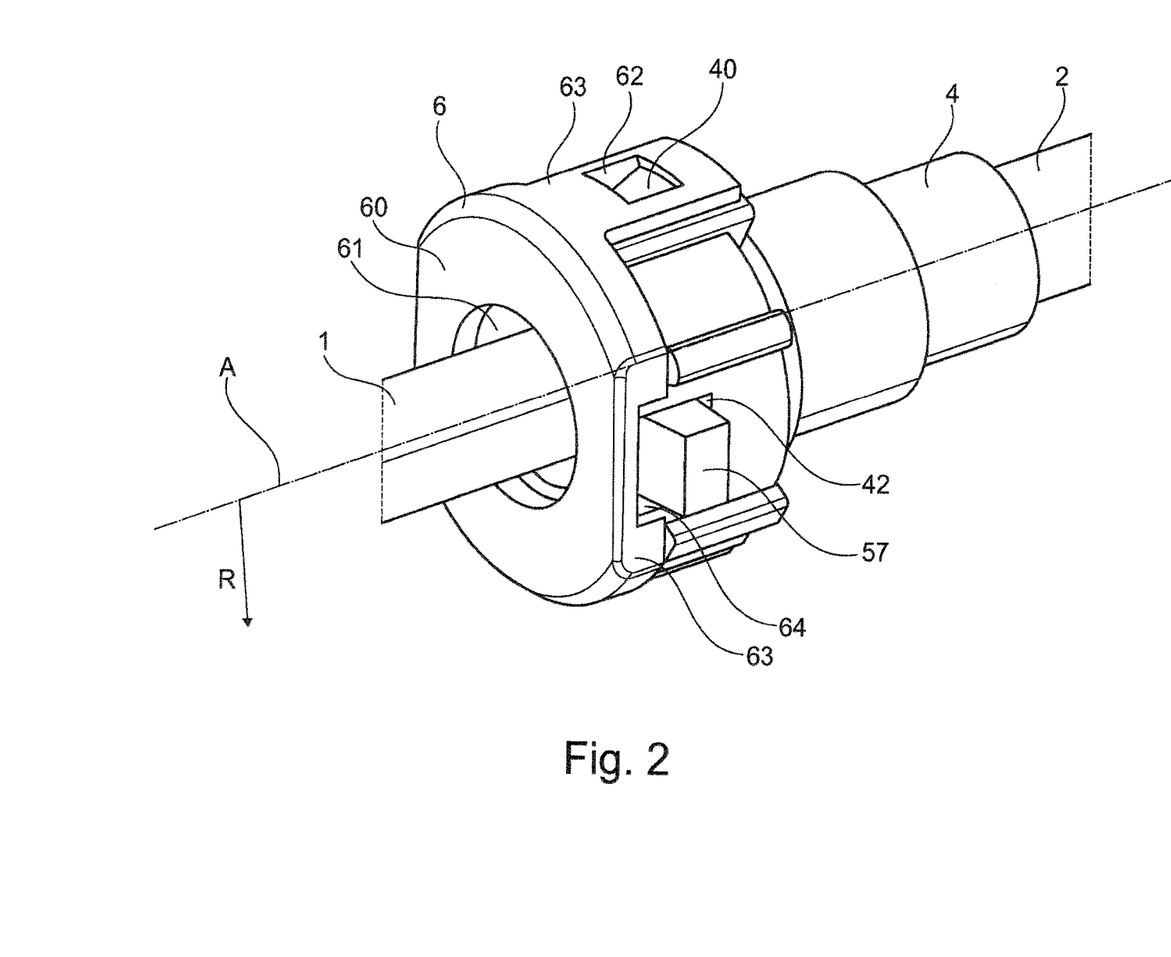
FIG. 2 shows a perspective schematic of the assembled quick connection arrangement of FIG. 1.

FIG. 1 shows a perspective schematic sectional representation of a quick connection arrangement 3 with fluid line 2 and inserted and locked connecting piece 1. FIG. 2 shows a perspective schematic of the assembled quick connection arrangement of FIG. 1.

Figure 3:
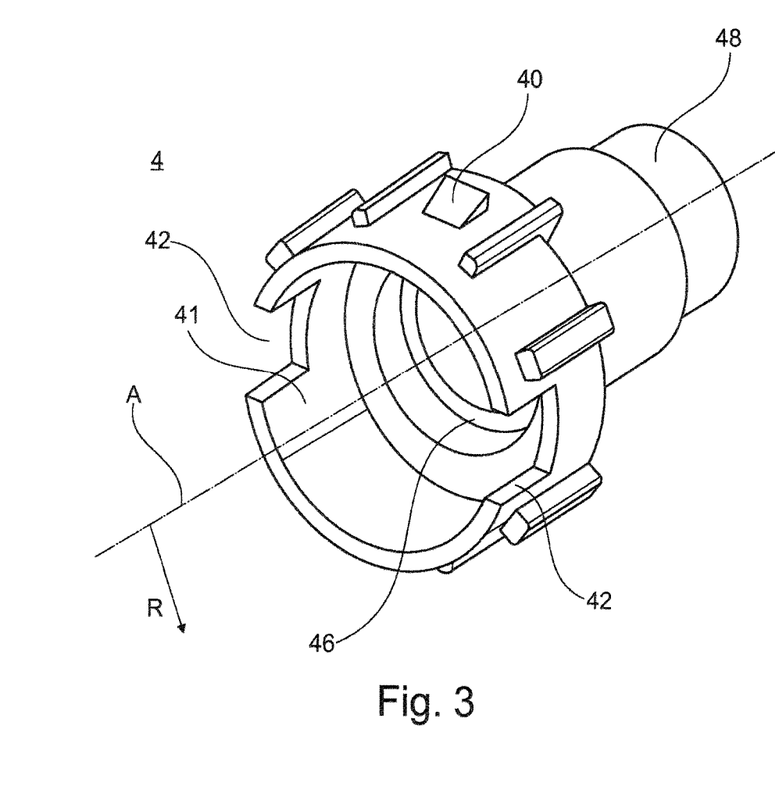
FIG. 3 shows a perspective schematic representation of the housing of the quick connection arrangement.
Figure 4:
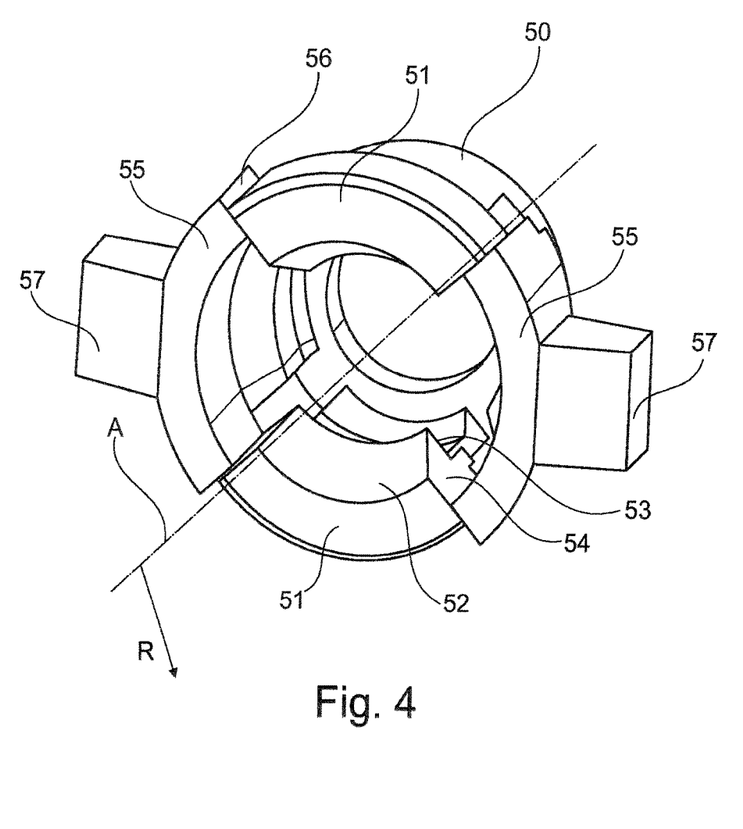
FIG. 4 shows a perspective schematic representation of the locking body of the quick connection arrangement.
Figure 5:
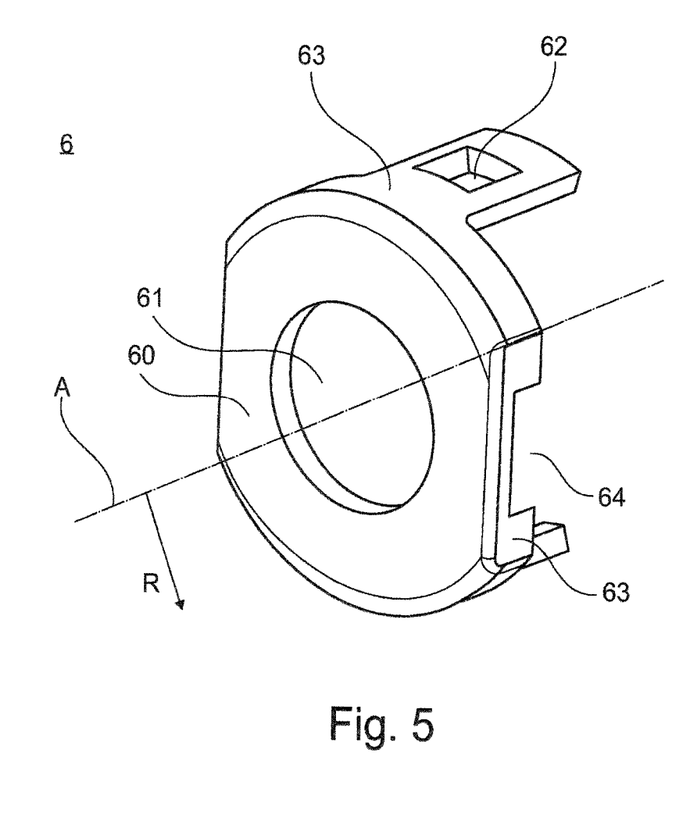
FIG. 5 shows a perspective schematic representation of the cover of the quick connection arrangement.

Quick connection arrangement 3 has a housing 4, a locking body 5 and a cover 6 which in FIGS. 3 to 5 are represented individually in each case in a perspective schematic representation.

Housing 4 (see also FIG. 3) substantially defines a cylindrical body through which a medium can flow in its direction of longitudinal axis A. This medium is preferably a fluid. At its end in the direction of longitudinal axis A, housing 4 has an opening 48 for receiving a fluid line 2. The fluid line 2 can be pushed up to a corresponding stop 49 inside housing 4 into its opening 48. The fastening of pushed-in fluid line 2 in opening 48 can be carried out, for example, non-positively and/or positively by a connecting piece with a fir tree profile. Alternatively or additionally, this fastening can be carried out by a materially bonded connection such as, for example, by welding. The welding can be, for example, friction or laser welding.

Housing 4 has a connecting piece opening 41 for receiving a connecting piece 1 (SAE connecting piece 1) on the end opposite opening 48 of fluid line 2 in the direction of longitudinal axis A. Connecting piece 1 can be pushed into the connecting piece opening 41 up to a corresponding stop 47 inside housing 4.

Connecting piece 1 has at its end with which connecting piece 1 is pushed into housing 4 a sealing arrangement which, from the inside to the outside, has a first sealing ring 71, a spacer ring 73, a second sealing ring 72 and a guide bushing 74. The two sealing rings (71, 72) are embodied as O-rings. Alternatively, a simple sealing arrangement 71 to 74 can also be used which is made, for example, of only one sealing ring 71 (O-ring).

Connecting piece 1 furthermore has a collar 11 which is formed as a closed ring on the outer surface thereof. Alternatively, however, projections formed in sections on the outer surface of connecting piece 1 could be used in order to achieve an action according to the invention between connecting piece 1 and quick connection arrangement 3. Collar 11 serves to lock connecting piece 1 in housing 4 of quick connection arrangement 3; this is brought about via a locking body 5 which is provided inside housing 4.

Locking body 5 (see also FIG. 4) includes an annularly closed annular body 50 from which, on the one hand, two locking elements 51 extend which are radially opposite one another and, offset by approximately 90° thereto, on the other hand, the annular body also has two unlocking elements 55 which are radially opposite one another and extend in the direction of longitudinal axis A.

Both locking elements 51 have on their radially internal side an insertion slant 52 and a rear engagement surface 53. The inclination of insertion slants 52 is formed in such a manner that radial projection 11 of connecting piece 1 slides on the insertion slants 52 during insertion into quick connection arrangement 3 and both locking elements 51 can be deflected radially to the outside as a result. That is, both locking elements 51 spring back radially inwards in order to get behind projection 11 of inserted connecting piece 1 to lock the inserted connecting piece 1 in longitudinal direction A. For this purpose, rear engagement surfaces 53 are formed so that they cannot be radially deflected by projection 11 so that connecting piece 1 cannot be pulled out of quick connection arrangement 3 after it is locked in longitudinal direction A. For this purpose, rear engagement surfaces 53 are embodied to stand as perpendicular as possible.

Both unlocking elements 55 are arranged and formed in such a manner that they can not hinder the movement of connecting piece 1 in longitudinal direction A. They are formed to spring back radially to the outside so that unlocking elements 55, if they have been pushed radially inwards towards longitudinal axis A by forces acting from the outside, thereafter spring back again automatically into their initial position.

Locking elements 51 and unlocking elements 55 have contact surfaces (54, 56) aligned in each case in the circumferential direction which contact one another in this preferred embodiment, which, however, is not necessary for the function according to the invention of the quick connection arrangement 3; for this purpose, it is sufficient if contact surfaces (54, 56) contact one another when they are intended to transmit forces to one another in the circumferential direction. In any event, contact surfaces (54, 56) are formed so that they have as low as possible frictional resistance between one another.

Both unlocking elements 55 furthermore have respective push-in elements 57 which protrude radially to the outside. This serves as a working surface for forces to be applied radially inwards from the outside onto unlocking elements 55. The push-in elements 57 protrude out of corresponding opening cutouts 42 of housing 4 as well as indentations 64 of cover 6 radially to the outside therefrom.

Cover 6 (see also FIG. 5) of quick connection arrangement 3 has a radially running cover surface 60 with a concentric connecting piece opening 61 which points in the direction of longitudinal axis A and through which connecting piece 1 can protrude and be guided. In longitudinal direction A, cover 6 has two lateral surfaces 63 which are radially opposite one another. The lateral surfaces 63 have respective locking openings 62 into which corresponding projections 40 of housing 4 can engage in order to hold cover 6 latched-in on housing 4. Cover 6 furthermore has in longitudinal direction A two lateral surfaces 63 which are radially opposite one another with indentations 64 running in longitudinal direction A for push-in elements 57 of unlocking elements 55.

Figure 6:
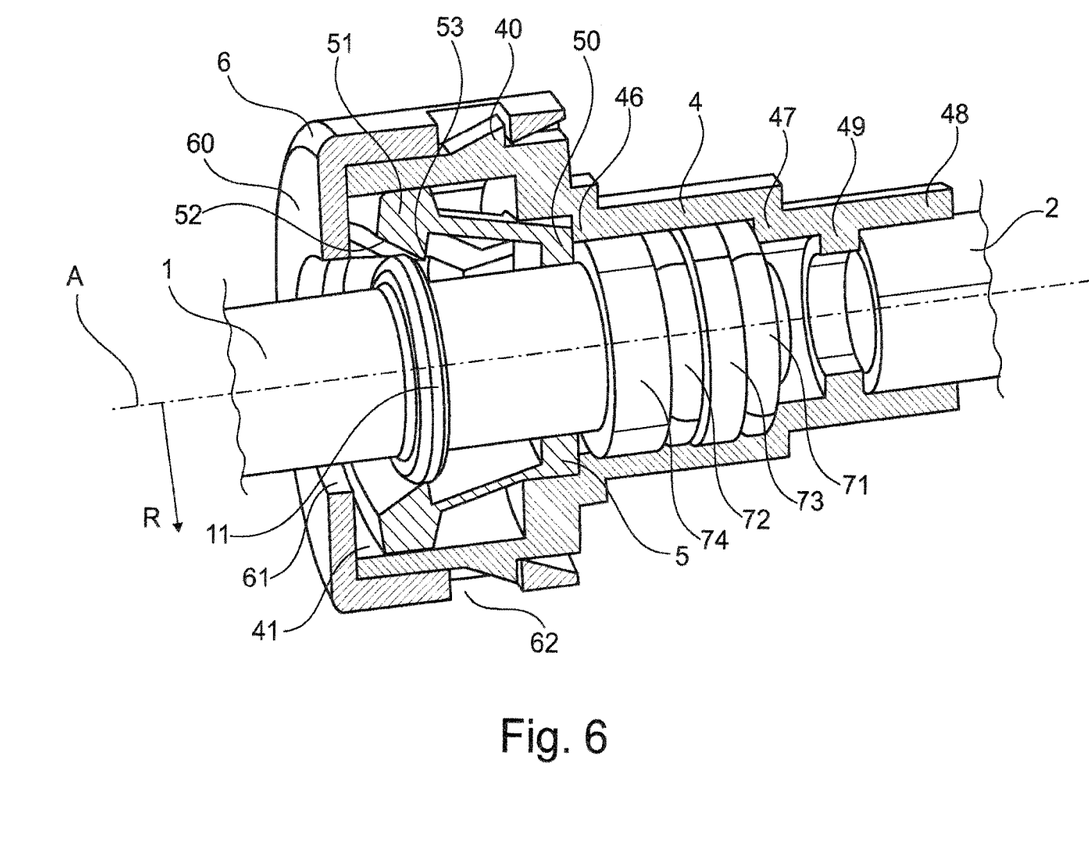
FIG. 6 shows a perspective schematic sectional representation of the quick connection arrangement with fluid line and partially inserted and unlocked connecting piece.

The mode of operation of quick connection arrangement 3 during locking of connecting piece 1 in quick connection arrangement 3 will now be described below with reference to FIGS. 1, 2 and 6:
  connecting piece 1 is inserted in the direction of longitudinal axis A through connecting piece opening 61 of cover 6 into connecting piece opening 41 of housing 4 (see FIG. 6); and,
  connecting piece 1 lifts, by means of its projection 11, locking elements 51 via their insertion slants 52 (see FIG. 6) until projection 11 is locked in longitudinal direction A behind rear engagement surfaces 53 of locking elements 51 (see FIG. 1).

Figure 7:
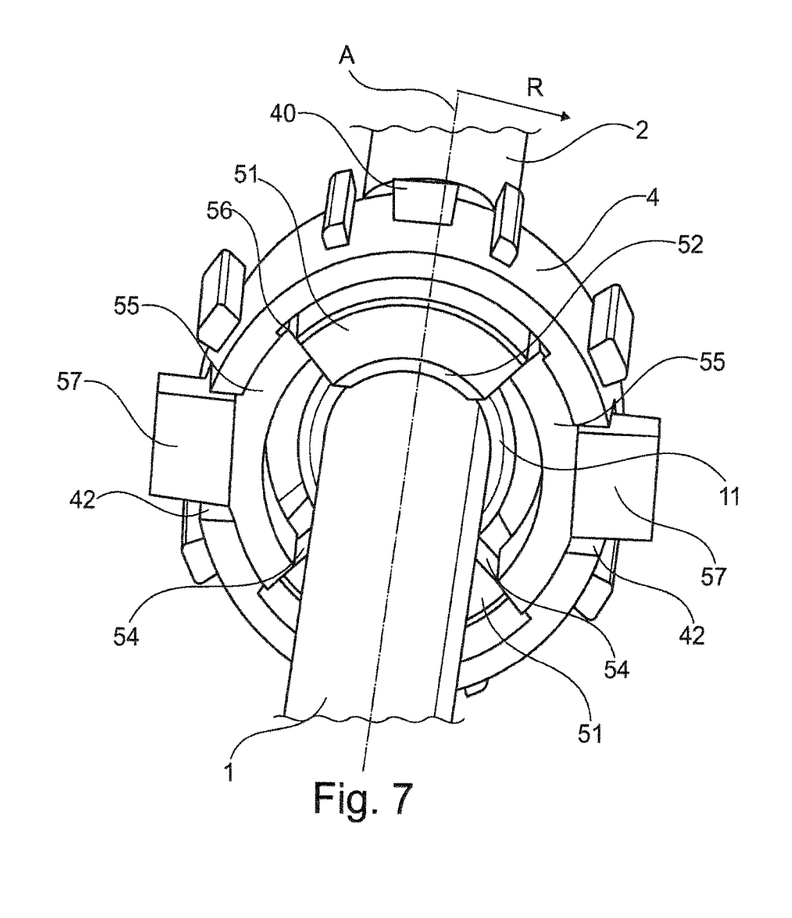
FIG. 7 shows a further perspective schematic sectional representation of the view of FIG. 1 without a cover; and, FIG. 8 shows a perspective schematic sectional representation of the quick connection arrangement with a fluid line and unlocked connecting piece without a cover.
Figure 8:
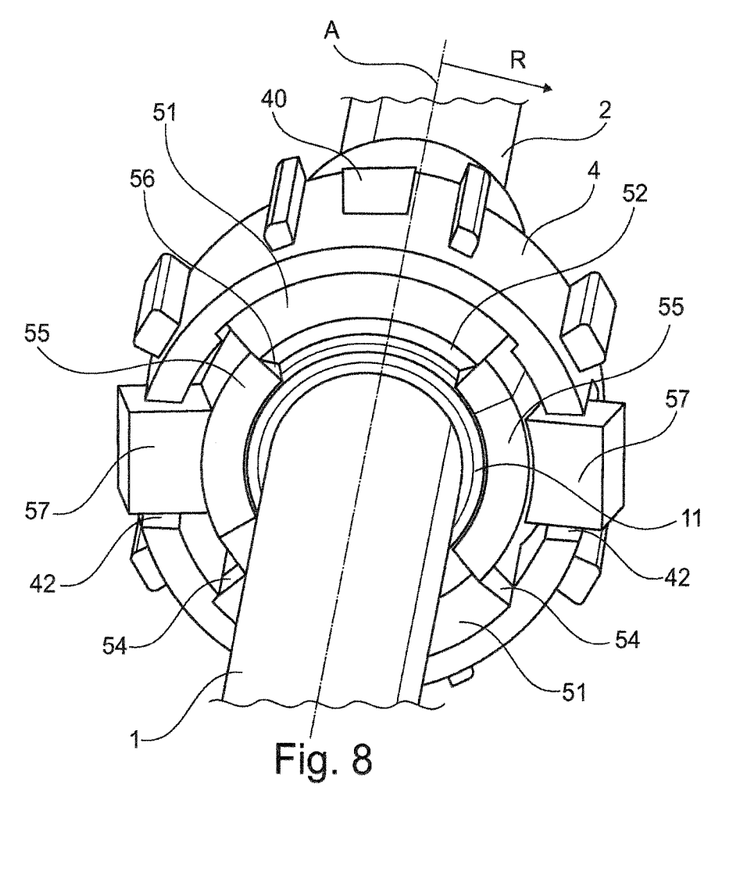

The mode of operation according to the invention of quick connection arrangement 3 during reusable unlocking of connecting piece 1 out of quick connection arrangement 3 will now be described below with reference to FIGS. 7 and 8.

In the locked state, rear engagement surfaces 53 of locking elements 51 engage behind projection 11 of connecting piece 1 in longitudinal direction A. As a result of their radially inwardly directed spring bias, locking elements 51 retain this position themselves and can also radially lie against the outer surface of connecting piece 1. The contact surfaces 54 of locking elements 51 are aligned in the circumferential direction and lie touching the corresponding contact surfaces 56 of unlocking elements 55 (see FIG. 7). The contact surfaces 56 are likewise aligned in the circumferential direction.

If the intention is now to pull connecting piece 1 out of quick connection arrangement 3 in longitudinal direction A, unlocking elements 55 are pushed in from the outside and as a result moved radially inwards via their push-in elements 57 which protrude radially both out of corresponding opening cutouts 42 of housing 4 and corresponding indentations 64 of cover 6. As a result, contact surfaces 56 of unlocking elements 55 exert forces on corresponding contact surfaces 54 of locking elements 51 in the circumferential direction. The radially inwardly acting forces of unlocking elements 55 are transmitted to locking elements 51 so that they are moved radially outwards. As a result, rear engagement surfaces 53 of locking elements 51 are lifted off radially so far from connecting piece 1 that they release projection 11 of connecting piece 1 in longitudinal direction A and connecting piece 1 can then be pulled out of quick connection arrangement 3 in longitudinal direction A (see FIG. 8).

The freedom of movement of unlocking and locking elements (55, 51) in radial direction R is limited by the configuration of housing 4 in such a manner that a reliable and functional action of the elements (55, 51) is ensured without damaging them and without hindering unlocked connecting piece 1 from being pulled out.

Once connecting piece 1 has been pulled out of quick connection arrangement 3, the radially pushing-in force can again be absorbed by push-in elements 57 of unlocking elements 55. These then spring back radially to the outside into their starting position again and absorb the forces acting in the circumferential direction from contact surfaces 54 of locking elements 51. As a result, these in turn spring back radially inwards back into their starting position.

In this manner, connecting piece 1 can be easily and quickly unlocked and pulled out of quick connection arrangement 3 according to the invention which is undamaged after this procedure and is immediately available again ready for use in the starting state in order to once again receive a connecting piece 1 without further measures having to be taken.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description

A Longitudinal axis, longitudinal direction
R Radius, radial direction perpendicular to longitudinal axis A
1 (SAE) connecting piece
11 Radial projection, preferably collar of connecting piece 1
2 Media line, preferably fluid line
3 Quick connection arrangement
4 Housing of quick connection arrangement 3
40 Projections for retaining cover 6 in longitudinal direction A
41 Connecting piece opening
42 Opening cutouts for unlocking elements 55 or push-in elements 57
46 Stop for locking body 5
47 Stop for first sealing ring 71
48 Opening for fluid line 2
49 Stop for fluid line 2
5 Locking body
50 Annular body of locking body 5
51 Locking elements
52 Insertion slants of locking elements 51
53 Rear engagement surfaces of locking elements 51
54 Contact surfaces of locking elements 51
55 Unlocking elements
56 Contact surfaces of unlocking elements 55
57 Push-in elements of unlocking elements 55
6 Cover
60 Cover surface of cover 6
61 Connecting piece opening of cover surface 60
62 Locking openings for receiving projections 40
63 Lateral surfaces of cover 6
64 Indentations of lateral surfaces 63 for unlocking elements 55 or push-in elements 57

71 First sealing ring (O-ring)
72 Second sealing ring (O-ring)
73 Spacer ring
74 Guide bushing

What is claimed is:

1. A quick connection arrangement for detachably connecting a medium line to a connecting piece, the quick connection arrangement comprising:
    a housing defining a longitudinal direction (A) and a first opening configured to receive said medium line therein;
    said housing defining a second opening for receiving said connecting piece so as to permit a medium to flow through said housing between said medium line and said connecting piece;
    a locking body arranged in said second opening and configured to lock the connecting piece in said second opening;
    said locking body having at least two locking elements configured and confined to move only radially and to lock the connecting piece in said second opening in the longitudinal direction (A);
    said locking body further having at least two unlocking elements configured and confined to move only radially to release said connecting piece when locked in said second opening by said locking elements;
    said locking body defining a circumferential direction and a radial direction R;
    said locking elements each having respective first contact surfaces;
    said unlocking elements each having respective second contact surfaces;
    said first and said second contact surfaces being aligned in the circumferential direction; and,
    each one of said first contact surfaces being in slideable contact engagement with a corresponding one of said second contact surfaces so as to permit radial inward forces applied to said unlocking elements in the direction R toward said longitudinal direction to be transmitted directly to said locking elements via said contact surfaces as respective forces in the circumferential direction to cause said locking elements to move radially outwardly and unlatch said connecting piece.

2. The quick connection arrangement of claim 1, wherein said locking body has two locking elements formed integrally therewith and disposed substantially radially opposite each other and two unlocking elements formed integrally therewith and disposed substantially radially opposite each other.

3. The quick connection arrangement of claim 2, wherein:
    said two unlocking elements are arranged offset by approximately 90° to said two locking elements with respect to said circumferential direction.

4. The quick connection arrangement of claim 1, wherein said locking elements and said unlocking elements are configured to be radially resiliently biased.

5. The quick-connection arrangement of claim 4, wherein:
    said locking elements are configured to be radially inwardly resiliently biased; and,
    said unlocking elements are configured to be radially outwardly resiliently biased.

6. The quick connection arrangement of claim 1, wherein said unlocking elements are configured to be radially inwardly pushable so as to cause said second contact surfaces of said unlocking elements to push said locking elements radially outwardly via said first contact surfaces.

7. The quick connection arrangement of claim 1, wherein said housing defines at least two opening cutouts disposed radially opposite to each other and configured to enable an actuation of said unlocking elements therethrough.

8. A quick connection arrangement for detachably connecting a medium line to a connecting piece, the quick connection arrangement comprising:
    a housing defining a longitudinal direction (A) and a first opening configured to receive said medium line therein;
    said housing defining a second opening for receiving said connecting piece so as to permit a medium to flow through said housing between said medium line and said connecting piece;
    a locking body arranged in said second opening and configured to lock the connecting piece in said second opening;
    said locking body having at least two locking elements configured to act radially and to lock the connecting piece in said second opening in the longitudinal direction (A);
    said locking body further having at least two unlocking elements configured to act radially to release said connecting piece when locked in said second opening by said locking elements;
    said locking body defining a circumferential direction and a radial direction R;
    said locking elements each having respective first contact surfaces;
    said unlocking elements each having respective second contact surfaces;
    said first and said second contact surfaces being aligned in the circumferential direction;
    each one of said first contact surfaces being in slideable contact engagement with a corresponding one of said second contact surfaces so as to permit radial inward forces applied to said unlocking elements in the direction R to be transmitted directly to said locking elements via said contact surfaces to cause said locking elements to move radially outwardly and unlatch said connecting piece;
    a cover for fixing said locking body within said housing;
    said cover defining a locking opening; and,
    said housing having a projection configured to hold said cover in the longitudinal direction (A) via said locking opening.

9. A locking body for use in a quick connection arrangement having a housing defining a longitudinal direction (A) and a first opening configured to receive a medium line therein, the housing defining a second opening for receiving a connecting piece so as to permit a medium to flow through the housing between the medium line and the connecting piece, the locking body comprising:
    said locking body being adapted to be arranged in the second opening;
    said locking body having at least two locking elements configured and confined to move only radially and to lock the connecting piece in the second opening in the longitudinal direction (A);
    said locking body further having at least two unlocking elements configured and confined to move only radially to release the connecting piece when locked in said second opening via said locking elements;
    said locking body defining a circumferential direction and a radial direction R;
    said locking elements each having respective first contact surfaces;
    said unlocking elements each having respective second contact surfaces;

said first and said second contact surfaces being aligned in the circumferential direction; and, each one of said first contact surfaces being in slideable contact engagement with a corresponding one of said second contact surfaces so as to permit radial inward forces applied to said unlocking elements in the direction R toward said longitudinal direction to be transmitted directly to said locking elements via said contact surfaces as respective forces in the circumferential direction to cause said locking elements to move radially outwardly and unlatch said connecting piece.

10. A quick connection arrangement for detachably connecting a medium line to a connecting piece, the quick connection arrangement comprising:

a housing defining a longitudinal direction (A) and a first opening configured to receive said medium line therein;

said housing defining a second opening for receiving said connecting piece so as to permit a medium to flow through said housing between said medium line and said connecting piece;

a locking body arranged in said second opening and configured to lock the connecting piece in said second opening;

said locking body having at least two locking elements configured and confined to act only radially and to lock the connecting piece in said second opening in the longitudinal direction (A);

said locking body further having at least two unlocking elements configured and confined to act only radially to release said connecting piece when locked in said second opening by said locking elements;

said locking body defining a circumferential direction and a radial direction R;

said locking elements each having respective first contact surfaces;

said unlocking elements each having respective second contact surfaces;

said first and said second contact surfaces being aligned in the circumferential direction;

each one of said first contact surfaces being in slideable contact engagement with a corresponding one of said second contact surfaces so as to permit radial inward forces applied to said unlocking elements in the direction R toward said longitudinal direction to be transmitted directly to said locking elements via said contact surfaces as respective forces in the circumferential direction to cause said locking elements to move radially outwardly and unlatch said connecting piece;

said locking body having two locking elements formed integrally therewith and being disposed substantially radially opposite each other and two unlocking elements formed integrally therewith and being disposed substantially radially opposite each other; and, said locking elements and said unlocking elements being configured to be radially resiliently biased.

11. The quick-connection arrangement of claim 10, wherein:

said locking elements are configured to be radially inwardly resiliently biased; and, said unlocking elements are configured to be radially outwardly resiliently biased.

12. The quick connection arrangement of claim 11, wherein said housing defines at least two opening cutouts disposed radially opposite to each other and configured to enable an actuation of said unlocking elements therethrough.

13. A quick connection arrangement for detachably connecting a medium line to a connecting piece, the quick connection arrangement comprising:

a housing defining a longitudinal direction (A) and a first opening configured to receive said medium line therein;

said housing defining a second opening for receiving said connecting piece so as to permit a medium to flow through said housing between said medium line and said connecting piece;

a locking body arranged in said second opening and configured to lock the connecting piece in said second opening;

said locking body having at least two locking elements configured to act radially and to lock the connecting piece in said second opening in the longitudinal direction (A);

said locking body further having at least two unlocking elements configured to act radially to release said connecting piece when locked in said second opening by said locking elements;

said locking body defining a circumferential direction and a radial direction R;

said locking elements each having respective first contact surfaces;

said unlocking elements each having respective second contact surfaces;

said first and said second contact surfaces being aligned in the circumferential direction;

each one of said first contact surfaces being in slideable contact engagement with a corresponding one of said second contact surfaces so as to permit radial inward forces applied to said unlocking elements in the direction R to be transmitted directly to said locking elements via said contact surfaces to cause said locking elements to move radially outwardly and unlatch said connecting piece;

said locking body having two locking elements formed integrally therewith and being disposed substantially radially opposite each other and two unlocking elements formed integrally therewith and being disposed substantially radially opposite each other;

said locking elements and said unlocking elements being configured to be radially resiliently biased;

said locking elements being configured to be radially inwardly resiliently biased;

said unlocking elements being configured to be radially outwardly resiliently biased;

said housing defining at least two opening cutouts disposed radially opposite to each other and configured to enable an actuation of said unlocking elements therethrough;

a cover for fixing said locking body within said housing;

said cover defining a locking opening; and, said housing having a projection configured to hold said cover in the longitudinal direction (A) via said locking opening.

* * * * *